United States Patent
Schweigert

(10) Patent No.: US 10,183,201 B2
(45) Date of Patent: *Jan. 22, 2019

(54) METHOD OF MANUFACTURING A FACE PLATE FOR A GOLF CLUB HEAD

(71) Applicant: Karsten Manufacturing Corporation, Phoenix, AZ (US)

(72) Inventor: Bradley D. Schweigert, Anthem, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 26 days.

This patent is subject to a terminal disclaimer.

(21) Appl. No.: 15/396,911

(22) Filed: Jan. 3, 2017

(65) Prior Publication Data

US 2017/0106255 A1    Apr. 20, 2017

Related U.S. Application Data

(60) Continuation of application No. 14/795,556, filed on Jul. 9, 2015, now Pat. No. 9,539,476, which is a continuation of application No. 14/457,903, filed on Aug. 12, 2014, now Pat. No. 9,089,746, which is a continuation of application No. 13/209,321, filed on
(Continued)

(51) Int. Cl.
*A63B 53/04*   (2015.01)
*A63B 60/00*   (2015.01)
*B23C 3/13*    (2006.01)

(52) U.S. Cl.
CPC .......... *A63B 53/04* (2013.01); *A63B 53/0466* (2013.01); *A63B 60/00* (2015.10); *B23C 3/13* (2013.01); *A63B 2053/0408* (2013.01); *A63B 2053/0416* (2013.01); *A63B 2053/0458* (2013.01); *A63B 2053/0462* (2013.01); *Y10T 29/49* (2015.01); *Y10T 29/49826* (2015.01); *Y10T 29/49995* (2015.01); *Y10T 83/0304* (2015.04); *Y10T 407/1946* (2015.01); *Y10T 409/303752* (2015.01)

(58) Field of Classification Search
CPC . A63B 53/00; A63B 53/04; A63B 2053/0416; A63B 2053/0458; A63B 2053/0462; B23C 3/13; B23C 5/02; B23C 5/06; B23C 5/10
USPC ....... 29/557, 558; 407/53, 54; 473/329, 345, 473/349, 346, 342, 330, 331, 332
See application file for complete search history.

(56) References Cited

U.S. PATENT DOCUMENTS 1,461,548 A * 7/1923 West ..................... B23B 51/00
                                                    175/394
4,511,145 A   4/1985 Schmidt
(Continued)

FOREIGN PATENT DOCUMENTS

EP    1199088 A1    4/2002
GB    2363339 B    6/2004
(Continued)

OTHER PUBLICATIONS

Screen shot from Taylormade web site at www.taylormadegolf.com, Dec. 25, 2003, 1 page.
(Continued)

*Primary Examiner* — Christopher M Koehler

(57) ABSTRACT

Golf club heads with patterned face plates described herein. Other examples, embodiments and related methods are also disclosed herein.

17 Claims, 4 Drawing Sheets

Related U.S. Application Data

Aug. 12, 2011, now Pat. No. 8,826,512, which is a continuation of application No. 11/854,998, filed on Sep. 13, 2007, which is a division of application No. 10/803,837, filed on Mar. 17, 2004, now Pat. No. 7,347,794.

(56) References Cited

U.S. PATENT DOCUMENTS

| | | | |
|---|---|---|---|
| 4,610,581 A * | 9/1986 | Heinlein | B23C 5/10 144/240 |
| 5,405,136 A * | 4/1995 | Hardman | A63B 53/04 473/342 |
| 5,893,683 A * | 4/1999 | Johnson | B23C 5/109 407/113 |
| 5,930,887 A | 8/1999 | Tomita et al. | |
| 5,954,596 A | 9/1999 | Noble et al. | |
| 6,319,150 B1 * | 11/2001 | Werner | A63B 53/04 473/324 |
| 6,354,962 B1 * | 3/2002 | Galloway | A63B 53/02 473/342 |
| 6,381,828 B1 * | 5/2002 | Boyce | A63B 53/02 148/669 |
| 6,428,426 B1 | 8/2002 | Helmstetter et al. | |
| 6,428,427 B1 | 8/2002 | Kosmatka | |
| 6,440,011 B1 * | 8/2002 | Hocknell | A63B 53/02 148/669 |
| 6,471,600 B2 | 10/2002 | Tang et al. | |
| 6,497,629 B2 | 12/2002 | Takeda | |
| 6,508,722 B1 * | 1/2003 | McCabe | A63B 53/04 473/330 |
| 6,569,033 B2 | 5/2003 | Kosmatka | |
| 6,602,149 B1 | 8/2003 | Jacobson | |
| 6,605,007 B1 | 8/2003 | Bissonnette et al. | |
| 6,623,377 B2 | 9/2003 | Evans et al. | |
| 6,652,391 B1 | 11/2003 | Kubica et al. | |
| 6,695,937 B1 | 2/2004 | Stites | |
| 6,800,037 B2 | 10/2004 | Kosmatka | |
| 6,800,038 B2 * | 10/2004 | Willett | A63B 53/04 473/329 |
| 6,800,039 B1 | 10/2004 | Tseng | |
| 6,824,475 B2 * | 11/2004 | Burnett | A63B 53/04 473/329 |
| 6,840,872 B2 | 1/2005 | Yoneyama | |
| 6,863,626 B2 | 3/2005 | Evans et al. | |
| 6,881,159 B2 * | 4/2005 | Galloway | A63B 53/02 473/324 |
| 6,898,638 B2 | 5/2005 | Iwata et al. | |
| 6,904,663 B2 * | 6/2005 | Willett | A63B 53/04 29/557 |
| 7,014,570 B2 | 3/2006 | Evans et al. | |
| 7,018,303 B2 | 3/2006 | Yamamoto | |
| 7,025,693 B2 | 4/2006 | Sugimoto | |
| 7,029,403 B2 | 4/2006 | Rice et al. | |
| 7,169,062 B2 | 1/2007 | Chen | |
| 7,338,388 B2 * | 3/2008 | Schweigert | A63B 53/0466 473/342 |
| 7,347,794 B2 * | 3/2008 | Schweigert | A63B 53/0466 473/342 |
| 7,584,531 B2 * | 9/2009 | Schweigert | A63B 53/0466 29/557 |
| 2002/0016218 A1 | 2/2002 | Takeda | |
| 2003/0013542 A1 * | 1/2003 | Burnett | A63B 53/04 473/329 |
| 2003/0064823 A1 * | 4/2003 | Yamamoto | A63B 53/04 473/329 |
| 2003/0083148 A1 * | 5/2003 | Willett | A63B 53/04 473/329 |
| 2003/0092505 A1 * | 5/2003 | Liou | A63B 53/04 473/345 |
| 2003/0139227 A1 | 7/2003 | Sugimoto | |
| 2003/0144079 A1 | 7/2003 | Yoneyama | |
| 2003/0195058 A1 * | 10/2003 | Rice | A63B 53/0466 473/329 |
| 2004/0083596 A1 * | 5/2004 | Willett | A63B 53/04 29/557 |
| 2005/0137029 A1 | 6/2005 | Evans et al. | |
| 2005/0209019 A1 * | 9/2005 | Schweigert | A63B 53/0466 473/329 |
| 2006/0063606 A1 * | 3/2006 | Schweigert | A63B 53/0466 473/329 |
| 2008/0004133 A1 * | 1/2008 | Schweigert | A63B 53/0466 473/342 |
| 2008/0039227 A1 * | 2/2008 | Schweigert | A63B 53/0466 473/329 |

FOREIGN PATENT DOCUMENTS

| | | |
|---|---|---|
| GB | 2363724 B | 7/2004 |
| GB | 2412072 B | 11/2007 |
| JP | 2001170227 A | 6/2001 |
| JP | 2003019233 A | 1/2003 |
| WO | 0200308 A1 | 1/2002 |

OTHER PUBLICATIONS

Mike MacArthur, "Cutting Tool Selection Impacts the Outcome of Hard Metal Machining." Nov. 2003, viewed online at http://www.moldmakingtechnology.com on Nov. 23, 2006, 6 pages.

* cited by examiner

METHOD OF MANUFACTURING A FACE PLATE FOR A GOLF CLUB HEAD

CROSS-REFERENCE TO RELATED APPLICATIONS

This is a continuation of U.S. patent application Ser. No. 14/795,556, filed on Jul. 9, 2015, now U.S. Pat. No. 9,539,476, which is a continuation of U.S. patent application Ser. No. 14/457,903, filed on Aug. 12, 2014, now U.S. Pat. No. 9,089,746, which is a continuation of U.S. patent application Ser. No. 13/209,321, filed on Aug. 12, 2011, now U.S. Pat. No. 8,826,512, which is a continuation of U.S. patent application Ser. No. 11/854,998, filed on Sep. 13, 2007, now abandoned, which is a division of U.S. patent application Ser. No. 10/803,837 filed on Mar. 17, 2004, now U.S. Pat. No. 7,347,794. The contents of the disclosures listed above are incorporated herein by reference.

BACKGROUND

This disclosure relates generally to golf clubs and, in particular, to so-called metal wood drivers.

Recent developments in golf club design have included improvements in drivers, which are clubs used primarily to strike a golf ball resting on a golf tee. These improvements have resulted in drivers with club heads consisting of a hollow shell usually made of metal, such as steel, aluminum, or titanium. These hollow shells have relatively thin walls including a thin front wall that is used to impact the golf ball. In order to prevent the front wall of these hollow shells from permanently deforming or cracking upon ball impact, it has become necessary to reinforce the front wall. One example of a golf club head consisting of a hollow metal shell with a reinforced front wall is disclosed in U.S. Pat. No. 4,511,145 to Schmidt. The club head disclosed in the Schmidt patent has an arched ridge extending between the heel and toe ends of the front wall. The arched ridge design of the Schmidt provides adequate reinforcement for drivers of moderate head volume, however, in an effort to obtain better and better performance from these hollow metal wood drivers, golf club manufacturers have increased the head volume from the moderate volume of 200 cc's to over 400 cc's during the past decade. As head size increases, less and less material is available to reinforce the front wall of the club face within acceptable weight limitations (i.e., around 200 grams mass). Consequently, more exotic materials such as forged or cold rolled titanium faces welded to a cast titanium body have been utilized in these super-oversized drivers. The rear surfaces of the front walls of these super-oversized drivers must be carefully contoured to provide adequate structural strength with a minimum amount of material.

The most critical region to reinforce, is, of course, the ideal ball impact point of the front wall. Because most golfer's swings vary somewhat from impact to impact, the reinforced region of the front wall must be distributed around the ideal impact point. However, since variations in a golfer's swing tend to be more in the heel and toe direction, rather than up or down, the distribution of hits tends to be within a horizontal, elliptical region rather than a circular region centered around the center of the club face. Accordingly, an elliptical, rather than a purely circular reinforcement is preferable. One example of a golf club head having a face with a contoured rear surface is U.S. Pat. No. 6,354,962 to Galloway, et al. The club head disclosed in Galloway has a face plate reinforced with elliptical regions that are formed as part of the forging process of the face plate. For clubs in which the club face is machined from a wrought alloy sheet or other sheet material, forming an elliptical reinforced region presents special problems. The face cannot be machined properly on a lathe because the lathe will produce only a circular reinforced region. One manufacturer is known to use an end mill that makes multiple elliptical passes to machine the reinforced region of the golf club face. This operation is, however, time consuming and unnecessarily costly.

BRIEF DESCRIPTION OF THE DRAWING

The present disclosure will be better understood from a reading of the following detailed description, taken in conjunction with the accompanying drawing figures in which like references designate like elements, and in which.

DETAILED DESCRIPTION

Figure 1:
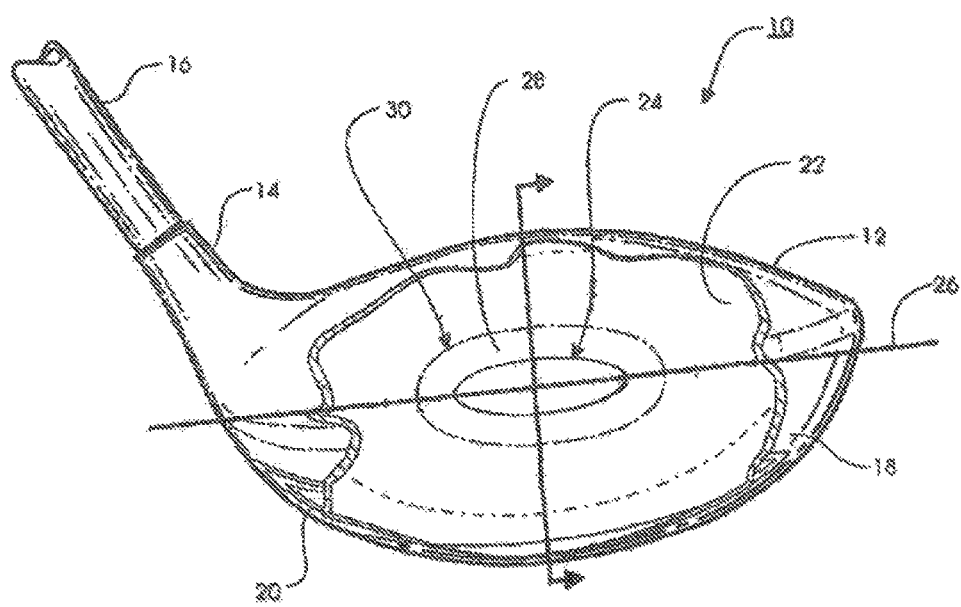
FIG. 1 is a partially cut-away rear perspective view of a golf club incorporating features of the present disclosure.

The drawing figures are intended to illustrate the general manner of construction and are not necessarily to scale. In the description and the in the drawing figures, specific illustrative examples are shown and herein described in detail. It should be understood, however, that the drawing figures and detailed description are not intended to limit the disclosure to the particular form disclosed but are merely illustrative and intended to teach one of ordinary skill how to make and/or use the disclosure claimed herein and for setting forth the best mode for carrying out the disclosure.

According to the present disclosure, a golf club head is manufactured by removing a portion of the rear surface of a face plate to form a central thickened region surrounded by a transition region that tapers to a thinner peripheral region. According to the illustrative embodiment, the face plate is a rolled sheet titanium alloy between 0.130 and 0.180 inches thick, a portion of the transition region of which is machined away to leave the central thickened region and to form the transition region and the thinner peripheral region. Rather than forming the rear surface contour of the face plate by making multiple passes with an end mill, however, the central portion, the transition region and the peripheral region are formed in a single elliptical pass with a special cutting tool. The cutting tool, or "form cutter" has a conical lateral cutting surface, which forms the transition region and the peripheral region in a single operation. Use of this form cutter to machine the transition region and peripheral region in a single operation yields greater uniformity in the rear surface contour of the face plate and saves substantial time and money over prior art multiple pass machining operations.

In one embodiment, a method for providing a golf club head comprises providing a face plate material for a face plate having a strike side, a back side, and a contoured surface at the back side. The contoured surface includes a central region having a first elliptical outer edge surrounded by a transition region extended from the central region to a peripheral region. The transition region has a second elliptical outer edge and a thickness decreasing in a non-linear transition from the first elliptical outer edge to the second elliptical outer edge. The thickness is measured from the strike side to the back side. Further, the first elliptical outer edge has a first aspect ratio, a first major axis, and a first minor axis. The second elliptical outer edge has a second aspect ratio, a second major axis, and a second minor axis. In addition, the second major axis is equal to the first major axis plus a predefined distance, the second minor axis is equal to the first minor axis plus the predefined distance, and the second aspect ratio is less than the first aspect ratio.

In another embodiment, a method for providing a golf club head comprises providing a shell having an opening and providing a face plate configured to be attached to the opening to form a hollow body. The face plate has a strike side, a back side, and a frustum-like surface of revolution at the back side. The frustum-like surface of revolution includes a first region having a first elliptical outer edge, a second region having a second elliptical outer edge, and a transition region between the first region and the second region. The transition region has a curved surface extending from the first elliptical outer edge to the second elliptical outer edge and a thickness decreasing in a non-linear transition from the first elliptical outer edge to the second elliptical outer edge. The thickness is measured from the strike side to the back side. Further, the first elliptical outer edge has a first aspect ratio, a first major axis, and first minor axis, and the second elliptical outer edge has a second aspect ratio, a second major axis, and a second minor axis. In addition, the second major axis is equal to the first major axis plus a predefined distance, the second minor axis is equal to the first minor axis plus the predefined distance, and the second aspect ration is less than the first aspect ratio.

Referring to FIG. 1, a golf club 10 includes a head 12, a hosel 14 and a shaft 16. Head 12 includes a hollow body 18 made of a metal material such as titanium. Hollow body 18 is formed as a shell 20, which may be assembled from a series of forged pieces but, in the illustrative embodiment, comprises a titanium investment casting. A face plate 22 is attached by conventional means such as plasma or electron beam welding to a corresponding opening 23 in shell 20 to form hollow body 18. Face plate 22 may be a conventional forged blank but, in the illustrative embodiment, comprises a rolled sheet titanium blank that is machined prior to welding to shell 20 as described more fully hereinafter.

As noted hereinbefore, because a golfer's swing tends to vary more in the heel-toe direction than it does up or down, the inventor of the present disclosure determined that the most efficient reinforcement would be an elliptical thickened region oriented so that the major axis of the reinforced region was substantially horizontal when the club is held in its normal position for addressing the ball. Accordingly, face plate 22 includes a central thickened region 24 that is substantially elliptical in shape with its major axis 26 oriented horizontal when the club is held in its normal address position. In the illustrative embodiment, central thickened region 24 is between 0.130 and 0.180 inches in thickness. Central thickened region 24 is surrounded by a transition region 28 that tapers from the central thickened region 24 to a peripheral region 30, which in the illustrative embodiment is 0.080 to 0.120 inches thick. Transition region 28 is also elliptical, however, for reasons that are explained more fully hereinafter, the major axis and minor axis of transition region 28 are a fixed amount larger than the respective major and minor axis of central thickened region 24. Accordingly, the aspect ratio of transition region 28 is lower than the aspect ratio of central thickened region 24 (in other words, transition region 28 is a "fatter" ellipse than central thickened region 24).

Figure 3:
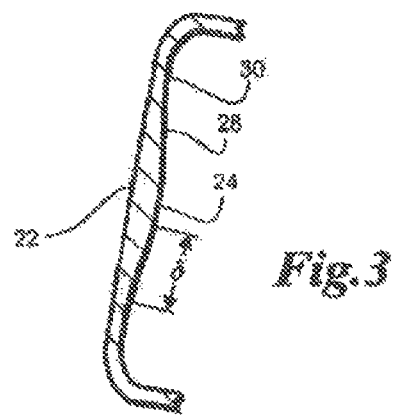
FIG. 3 is a cross-sectional view of the golf club of FIG. 2 taken along line 3-3.
Figure 4:
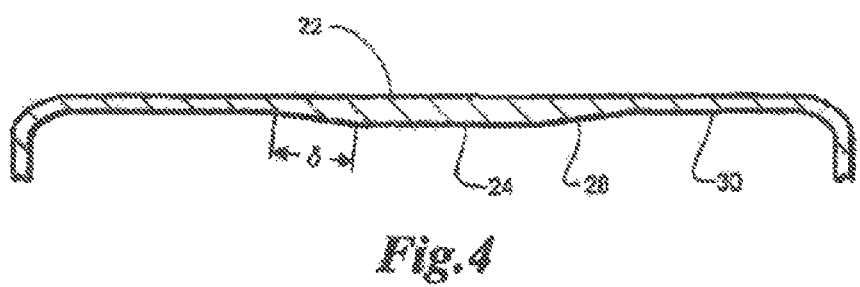
FIG. 4 is a cross-sectional view of the golf club of FIG. 2 taken along line 4-4.
Figure 5:
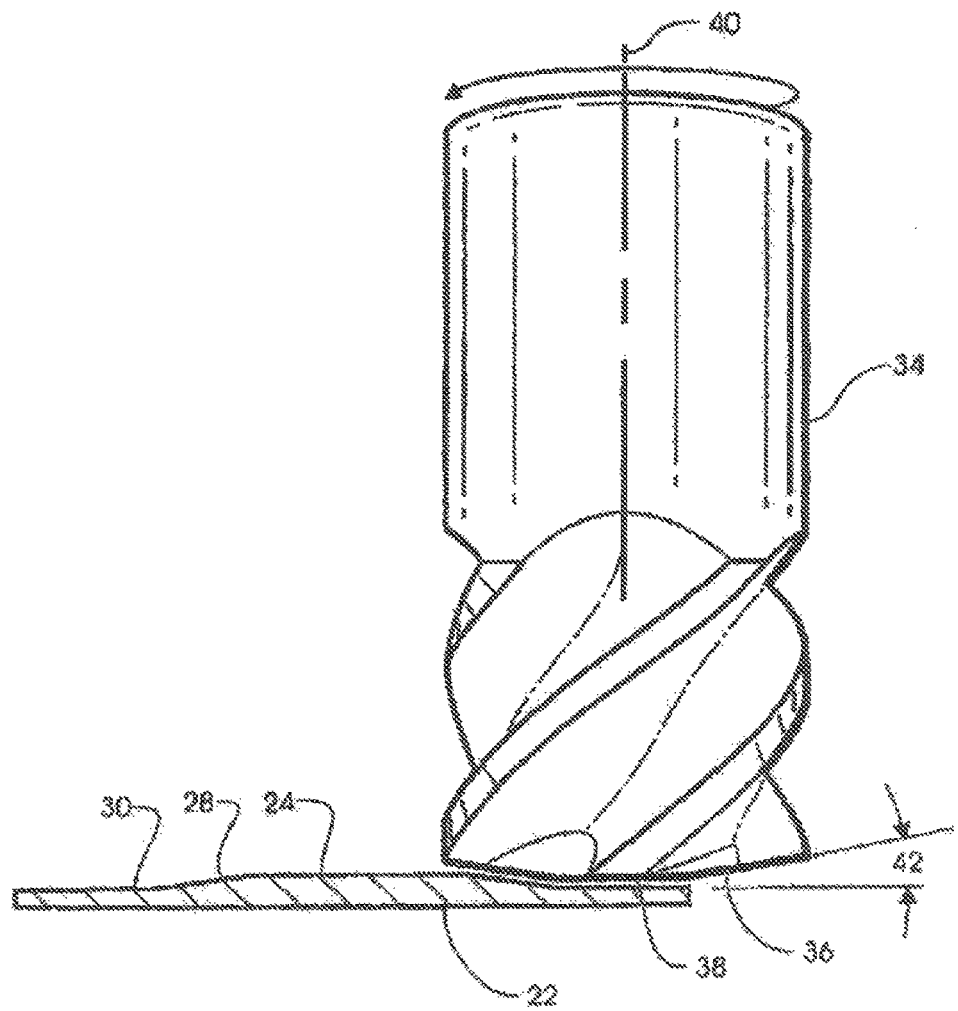
FIG. 5 is a side view of a machining step in the method of forming golf club head in FIG. 2.
Figure 6:
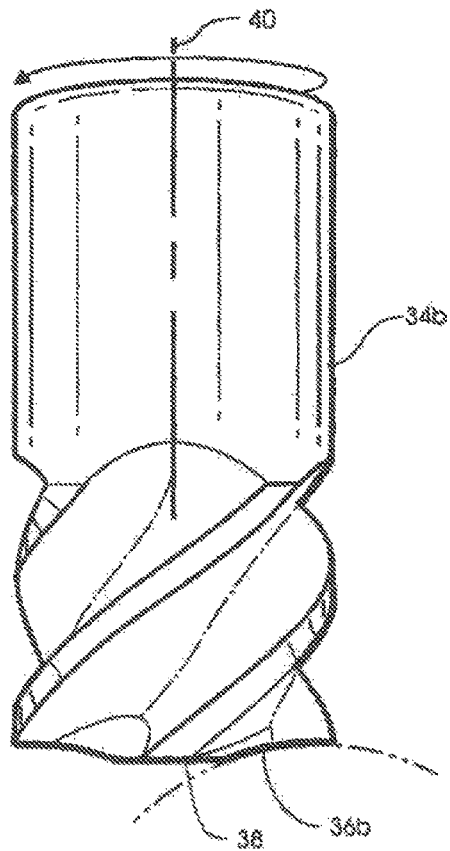
FIG. 6 is a side view of an alternative cutting tool used in the machining step of FIG. 5.
Figure 7:
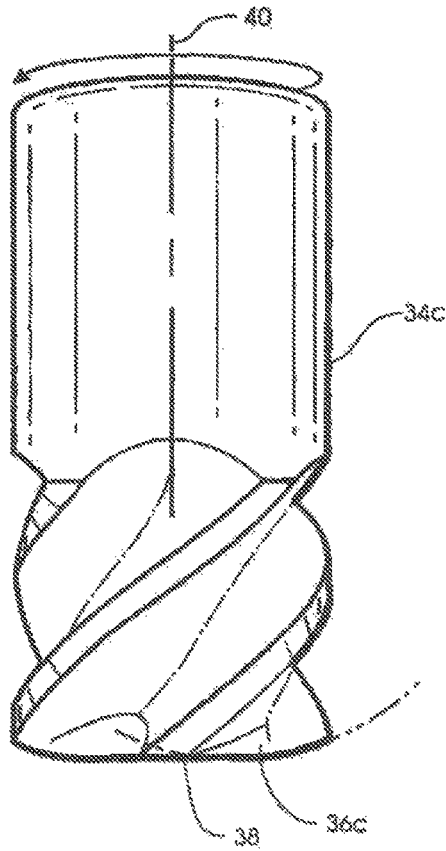
FIG. 7 is a side view of another alternative cutting tool used in the machining step of FIG. 5.

With reference to FIGS. 2-5, prior to assembly of face plate 22 to shell 20, the rear contours of face plate 20 are formed by a machining operation shown schematically in FIG. 5. The process begins with a blank face plate 32, which in the illustrative embodiment comprises a blank stamped from a rolled sheet of titanium alloy. The blank face plate 32 has a thickness equal to the final thickness of the central thickened region 24 of the finished face plate 22, which as noted hereinbefore is from 0.130 to 0.180 inches in thickness. The rear surface of blank face plate 32 is machined by using a cutting tool 34 to remove a portion thereof. The tip of cutting tool 34 has a lateral cutting surface 36 and a lower cutting surface 38. Lower cutting surface 38 is perpendicular to the axis 40 of cutting tool 34. Lateral cutting surface 36 is angled upward with respect to lower cutting surface 38 by an angle 42 of from about 5 to 20 degrees, but preferably about 13 degrees such that lateral cutting surface 36 defines a generally inverted conical frustum surface of revolution 44 as cutting tool 34 is rotated about its axis 40. Lateral cutting surface 36 may have straight edges as shown in FIG. 5, or may have edges 36b that are concave downward as in the cutting tool 34b shown in FIG. 6, or may have edges 36c that are convex downward as in the cutting tool 34c shown in FIG. 7. yielding a conical frustum surface of revolution (and corresponding transition regions) having correspondingly curved sides.

Figure 2:
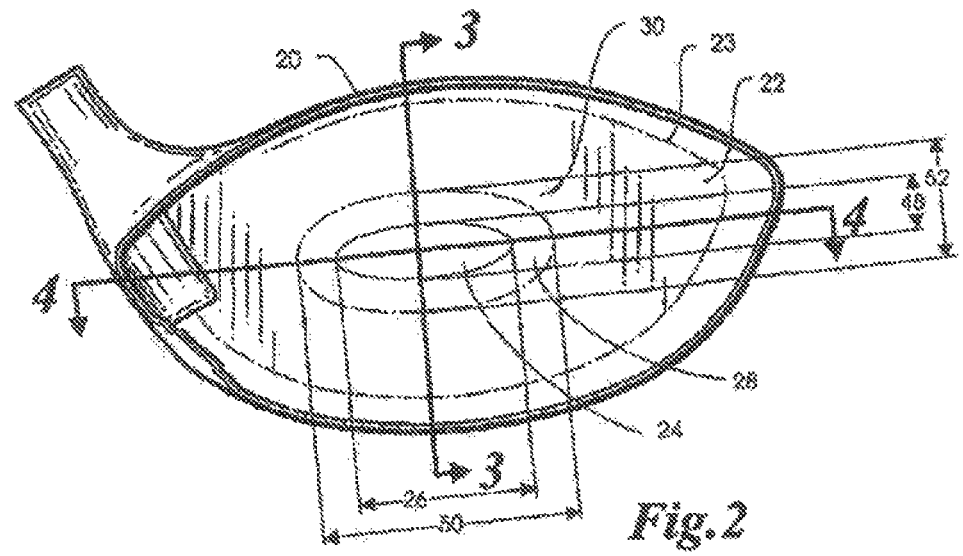
FIG. 2 is a rear cross-sectional view of the golf club of FIG. 1.

As can be seen from FIG. 5, as the lower cutting surface 38 and lateral cutting surface 36 are brought into contact with rear surface 46 of blank face plate 32, lower cutting surface 38 and lateral cutting surface 36 cooperate to cut a tapered transition region 28 and a flat perimeter region 30 simultaneously in a single pass, thus obviating the need to make multiple passes with an end mill as in the prior art. With particular reference to FIGS. 2-4, the major axis 26 of central thickened region 24 is from 0.65 to 1.05 inches in length. The minor axis 48 of central thickened region 24 is 0.25 to 0.45 inches in length. Accordingly, the aspect ratio of central thickened region 24 is between 1.4 and 4.2. In the illustrative embodiment, major axis 26 is approximately 0.85 inches and minor axis 48 is approximately 0.35 inches yielding an aspect ratio of approximately 2.4.

Major axis 50 and minor axis 52 of transition region 28 are a fixed amount "δ" greater than the respective major and minor axes of central thickened region 24, wherein the δ value can be chosen from a range of about 0.40 inches to about 1.20 inches. In the illustrative example, the major axis 50 and minor axis 52 are approximately 0.86 inches greater than the respective major and minor axes of central thickened region 24. Thus, major axis 50 in the illustrative embodiment is approximately 1.71 inches in length and minor axis 52 of transition region 28 is approximately 1.21 inches in length. Thus, the aspect ratio of transition region 28 is approximately 1.4 as opposed to the 2.4 aspect ratio of central thickened region 24. The high aspect ratio central raised portion surrounded by the lower aspect ratio transition region provides optimum distribution of material for improved performance and reliability.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and/or articles of manufacture described herein may be conforming or non-conforming to the rules of golf at any particular time. Accordingly, golf equipment related to the apparatus, methods, and/or articles of manufacture described herein may be advertised, offered for sale, and/or sold as conforming or non-conforming golf equipment. The apparatus, methods, and/or articles of manufacture described herein are not limited in this regard.

While at least some of the above examples have been depicted and/or described with respect to one or more types of golf clubs, the apparatus, methods, and/or articles of manufacture described herein may be applicable to other types of golf clubs. In some examples, the apparatus, methods, and/or articles of manufacture describe herein may be applicable to driver-type golf club(s), fairway wood-type golf club(s), hybrid-type golf club(s), iron-type golf club(s), wedge-type golf club(s), and/or putter-type golf club(s). Alternatively, the apparatus, methods, and/or articles of manufacture described herein may be applicable other type of sports equipment such as hockey stick(s), tennis racket(s), fishing pole(s), ski pole(s), etc.

Although certain illustrative embodiments and methods have been disclosed herein, it will be apparent from the foregoing disclosure to those skilled in the art that variations and modifications of such embodiments and methods may be made without departing from the spirit and scope of the disclosure. Accordingly, it is intended that the disclosure should be limited only to extent required by the appended claims and the rules and principals of applicable law.

The invention claimed is:

1. A golf club head comprising:
    a face plate having a contoured rear surface, the contoured rear surface including a central thickened region having a first non-circular, elliptical outer edge surrounded by a transition region tapered from the central thickened region toward a thinner peripheral region, the transition region having a second non-circular, elliptical outer edge,
    wherein the transition region comprises a frustum-like region formed by a straight edge of a lateral cutting surface associated with a cutting device where the lateral cutting surface is angled upward from about 5 to 20 degrees;
    wherein the first non-circular, elliptical outer edge has a first aspect ratio, a first major axis and a first minor axis,
    wherein the second non-circular, elliptical outer edge has a second aspect ratio, a second major axis and a second minor axis, the second major axis being equal to the first major axis plus a predetermined distance and the second minor axis being equal to the first minor axis plus the predetermined distance,
    wherein the first aspect ratio is greater than the second aspect ratio, and
    wherein the central thickened region comprises a maximum thickness of the face plate and wherein the central thickened region comprises a constant thickness throughout its entirety and extends through a centerpoint of the first elliptical outer edge and the second elliptical outer edge.

2. The golf club head of claim 1, wherein the transition region decreases from the first elliptical outer edge to the second elliptical outer edge at an angle of about 13 degrees.

3. The golf club head of claim 1, wherein the predetermined distance ranges from 0.40 inch and 1.20 inches.

4. The golf club head of claim 1, wherein the first major axis is approximately 0.85 inch and the minor axis of approximately 0.35 inch.

5. The golf club head of claim 4, wherein the first aspect ratio is approximately 2.4.

6. The golf club head of claim 1, wherein the second major axis is 1.71 inches, and the second minor axis is 1.21 inches.

7. The golf club head of claim 6, wherein the second aspect ratio is 1.4.

8. The golf club head of claim 1, wherein the face plate comprises a titanium alloy.

9. A golf club head comprising:
    a face plate having a contoured rear surface, the contoured rear surface including a central thickened region having a first non-circular, elliptical outer edge surrounded by a transition region tapered from the central thickened region toward a thinner peripheral region, the transition region having a second non-circular, elliptical outer edge,
    wherein the transition region comprises a frustum-like region formed by a non-straight edge of a lateral cutting surface associated with a cutting device;
    wherein the first non-circular, elliptical outer edge has a first aspect ratio, a first major axis and a first minor axis,
    wherein the second non-circular, elliptical outer edge has a second aspect ratio, a second major axis and a second minor axis, the second major axis being equal to the first major axis plus a predetermined distance and the second minor axis being equal to the first minor axis plus the predetermined distance,
    wherein the predetermined distance is greater than the first major and minor axis;
    wherein the first aspect ratio is greater than the second aspect ratio, and
    wherein the central thickened region comprises a maximum thickness of the face plate and wherein the central thickened region comprises a constant thickness throughout its entirety and extends through a centerpoint of the first elliptical outer edge and the second elliptical outer edge.

10. The golf club head of claim 9, wherein the lateral cutting surface of the cutting tool is concave.

11. The golf club head of claim 9, wherein the lateral cutting surface of the cutting tool is convex.

12. The golf club head of claim 9, wherein the angle of the transition region, measured from the second elliptical outer edge to the first elliptical outer edge is about 13 degrees.

13. The golf club head of claim 9, wherein the first major axis ranges from 0.65 inch to 1.05 inches.

14. The golf club head of claim 9, wherein the first minor axis ranges from 0.25 inch to 0.45 inch.

15. The golf club head of claim 9, wherein the predetermined distance is constant, ranging from 0.40 inch to 1.20 inches.

16. The golf club head of claim 9, wherein the second major and minor axis are 0.86 inch greater than the first major and minor axis.

17. The golf club head of claim 9, wherein the face plate comprises a titanium alloy.

* * * * *